(12) United States Patent
Herving

(10) Patent No.: US 7,750,273 B2
(45) Date of Patent: Jul. 6, 2010

(54) INDUCTION COOKING MAT FOR MAINTAINING TEMPERATURE IN FOOD AND DRINK

(76) Inventor: Ståle Herving, Vassvikvelen 14, Narvik (NO) N-8517

( * ) Notice: Subject to any disclaimer, the term of this patent is extended or adjusted under 35 U.S.C. 154(b) by 0 days.

(21) Appl. No.: 11/570,073

(22) PCT Filed: Jun. 16, 2005

(86) PCT No.: PCT/NO2005/000213

§ 371 (c)(1),
(2), (4) Date: Mar. 8, 2007

(87) PCT Pub. No.: WO2005/122854

PCT Pub. Date: Dec. 29, 2005

(65) Prior Publication Data

US 2008/0000895 A1    Jan. 3, 2008

(30) Foreign Application Priority Data

Jun. 17, 2004    (NO) .................................. 20042538

(51) Int. Cl.
H05B 6/12    (2006.01)
(52) U.S. Cl. ....................... 219/622; 219/621
(58) Field of Classification Search ......... 219/620–627, 219/647, 649, 667; 99/451, DIG. 14
See application file for complete search history.

(56) References Cited

U.S. PATENT DOCUMENTS

| 3,740,513 | A |  | 6/1973 | Peters et al |
| 3,786,222 | A |  | 1/1974 | Harnden |
| 4,038,518 | A |  | 7/1977 | Morton et al. |
| 5,155,316 | A | * | 10/1992 | Chiu .......................... 219/634 |
| 5,628,241 | A |  | 5/1997 | Chavanaz |
| 5,954,984 | A |  | 9/1999 | Ablah et al. |
| 6,291,805 | B1 |  | 9/2001 | Simeray |

FOREIGN PATENT DOCUMENTS

GB    1592034    8/1981
GB    2204477    11/1988

* cited by examiner

Primary Examiner—Quang T Van
(74) Attorney, Agent, or Firm—Christian D. Abel

(57) ABSTRACT

A device for maintaining temperature in food and drink by means of the induction principle. The device comprises a heating mat (10), on which induction containers and other types of containers for food and drink can be placed, and an energy converter (11) for connection to a power supply (46). The energy converter (11) converts the energy from the power supply to induction energy. The heating mat (10) comprises a hotplate (20) of a heat-resistant, non-metallic material, and at least one heating element (22) for generating a varying magnetic field by means of the induction energy from the energy converter (11).

5 Claims, 3 Drawing Sheets

INDUCTION COOKING MAT FOR MAINTAINING TEMPERATURE IN FOOD AND DRINK

TECHNICAL FIELD

The present invention relates to a device for maintaining temperature in food and/or drink by means of the induction principle. In this context the concept "maintaining temperature" means to keep food and/or drink at approximately the same temperature for shorter or longer periods. Consequently a gradual rise or drop in temperature will also be included in this concept.

THE PRIOR ART

Heating of food and drink today is normally carried out by the conversion of electrical energy to heat in a hotplate, whereupon the heat is then transferred by heat conduction to a receptacle containing the food. When heating food by induction, the electrical energy is transferred by means of a varying magnetic field to the food container. The container is designed so as to convert the energy in the varying magnetic field to heat.

A device for heating by means of induction requires an energy converter in order to convert the electrical energy from the power grid to high-frequency electrical energy, hereinafter called induction energy, which generates the above-mentioned varying magnetic field by means of one or more induction coils. Special containers are also required for the food, utensils such as pots and pans and the like, which are capable of generating heat as mentioned above. Such a container will hereinafter be called an induction container.

Serving locations, such as hotels, restaurants, cafes or the like, need to maintain the temperature in food and/or drink for prolonged periods after it has been prepared. This could also be applicable for private households. Known devices for maintaining temperature in food and drink consist of special units that are placed on the table or built into the table, comprising heating elements placed under a metal hotplate. The heat is transferred by heat conduction from the metal hotplate to the food container. These devices have a number of disadvantages, e.g. the heating elements are heavy and the tables with built-in heating elements are often separate tables that have to be wheeled out when required.

The disadvantage of the prior art is that such devices take up a great deal of space and are heavy. This means that they occupy storage space when not in use, and a lot of work is involved in moving them to and fro. Many serving locations use such tables when serving breakfast and lunch, while the tables are removed when dinner is served.

At the same time the metal hotplate covers the whole surface of the table, thereby causing everything placed on the table to be heated. Cold dishes therefore have to be placed on other types of table.

In patent publication U.S. Pat. No. 5,628,241, a device is disclosed for induction heating of serving trays with food. The device comprises a stand where a number of serving trays can be stacked, and between the serving trays units are mounted that are capable of being heated by magnetic induction. The whole stand is rolled into the device, whereupon a varying magnetic field causes the serving trays and consequently also the food to be heated. The device also comprises a number of sensors for detecting the presence or absence of serving trays in order to be able to control which induction coils should be activated.

U.S. Pat. No. 6,291,805 illustrates a device for induction heating comprising a substantially U-shaped member that is inserted in a tabletop.

Furthermore, publication U.S. Pat. No. 3,786,222 illustrates a device for induction heating where an aluminium foil of a special thickness is pressed down into a mould. Food is placed in the aluminium foil, which is then heated by induction. When the food is hot, the food can be eaten from the aluminium foil, which is then discarded, thereby reducing the need for clearing and washing up as well as storage of pans etc.

It is therefore desirable to produce a device for maintenance of heat by means of induction that occupies relatively little space and is easy to put out and clear away. It is also desirable for ordinary tables to be used together with the device.

In addition it is desirable to be able to place all types of food on the device, where only the food that requires to be hot remains hot.

SUMMARY OF THE INVENTION

The present invention relates to a device for maintaining temperature in food and drink by means of the induction principle, comprising a heating mat on which induction containers and other types of containers for food and drink can be placed, and an energy converter for connection to a power supply and to the heating mat, where the energy converter converts the energy from the power supply to induction energy and where the heating mat comprises:
 a plate of a heat-resistant, non-metallic material,
 at least one heating element for generating a varying magnetic field by means of the induction energy from the energy converter.

In a preferred embodiment the heating element is cast into, smelted into, glued to or In some other way mounted in the plate.

In a preferred embodiment the heat-resistant material in the plate can withstand a continuous temperature of approximately 100° C. and a maximum, transitory temperature of approximately 130° C.

In a preferred embodiment the material in the plate is flexible to enable the plate to be rolled up, bent or folded for storage.

In a preferred embodiment weak points are provided in the plate in order to Simplify folding up the heating mat for storage.

In a preferred embodiment the heating element comprises an induction coil in the form of an electrical conductor and a supply conductor connected to the energy converter.

In a preferred embodiment the heating mat further comprises a layer of ferrite or another metallic material, arranged under the heating elements.

DETAILED DESCRIPTION

The present invention will now be described by means of an example of preferred embodiments of the invention, where reference is made to attached drawings, in which.

Figure 1:
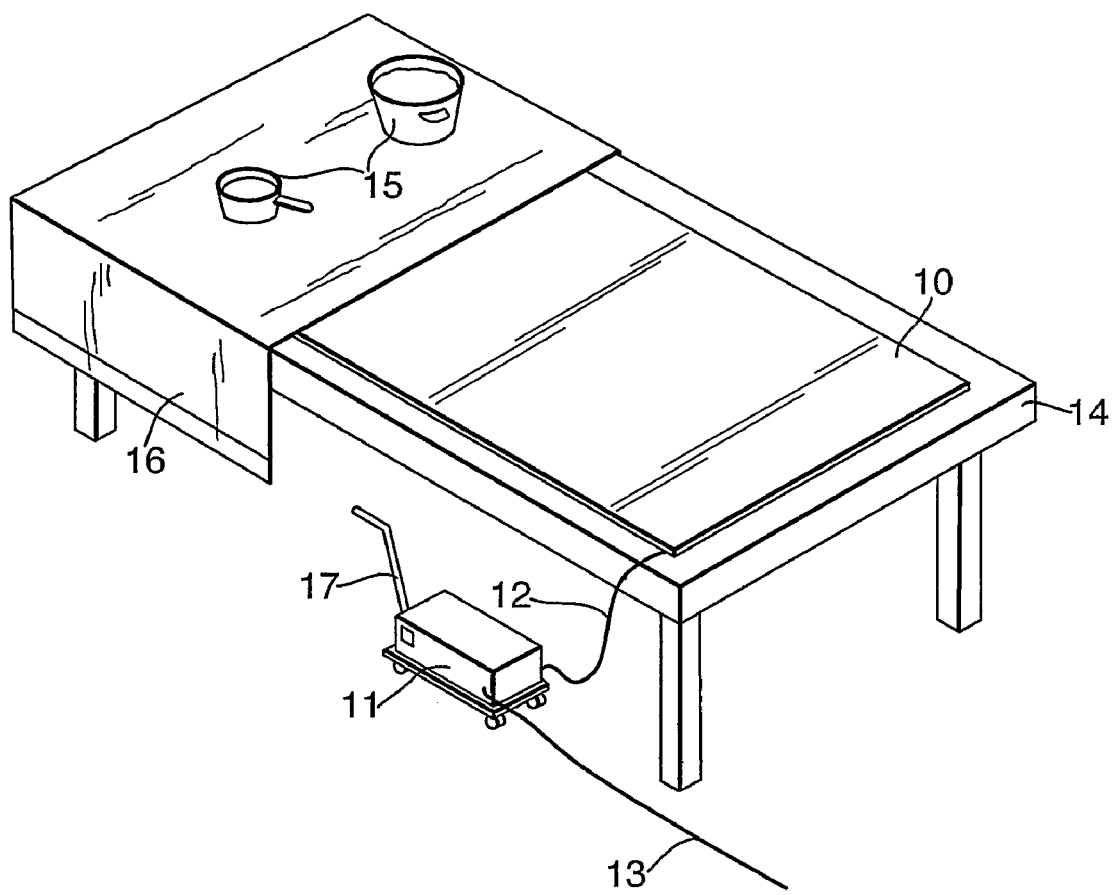
FIG. 1 is a perspective view of the use of a device according to the present invention, where parts of a decorative tablecloth are removed to make it easier to see the heating mat.

We now refer to FIG. 1, where an embodiment of the invention is illustrated. A device for maintaining temperature in food and drink comprises a heating mat 10 connected to an energy converter 11 by means of an electrical cable 12. The energy converter in turn is connected to a power supply 46 (illustrated in FIG. 2), such as the power supply grid, by means of an electrical power supply cable 13.

In FIG. 1 the heating mat 10 is placed on a table 14, on which are placed, for example, containers 15 of food and drink that is ready to serve. A decorative tablecloth 16 is preferably placed over the heating mat 10 as decoration. Furthermore, the energy converter is mounted on a transport unit 17 to facilitate the transport thereof.

The transport unit 17 is preferably of a size that enables it to be concealed below the table 14 and the decorative tablecloth 16.

Figure 3:
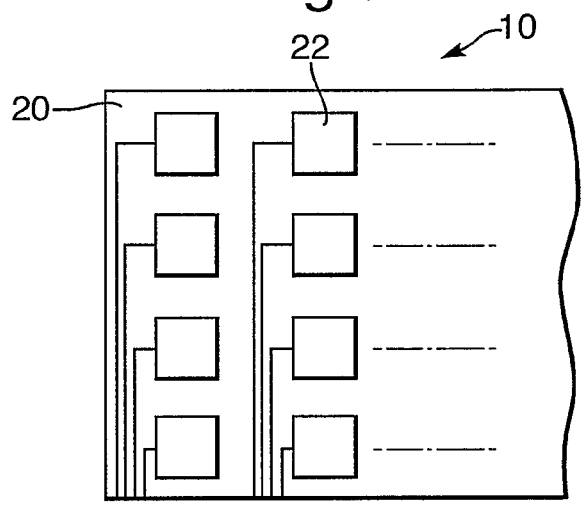
FIG. 3 is a schematic view of the position of the induction elements in the heating mat.

The heating mat 10 will now be described with reference to FIG. 3. Here the heating mat 10 comprises a thin plate 20 of a non-metallic material on which are mounted a plurality of heating elements 22. The thin plate 20 is preferably a flexible, heat-resistant material, which enables the plate 20 to be rolled up, bent or folded for storage.

The material in the thin plate 20 may be plastic, silicon, rubber, composite materials or the like. A material that has been found suitable to date is Elastolan™, which is relatively malleable, soft and workable, while being temperature-constant within the temperature limits required for the present embodiment. In this context temperature-constant means that the material can withstand a continuous temperature of approximately 100° C. and a maximum transitory temperature of approximately 130° C.

In the bottom of the heating mat 10 there is preferably placed a layer 19 of ferrite in powder form, which will have no effect on the softness and ductility of the heating mat 10. The object of this is to limit and/or obstruct the magnetic radiation in the direction down towards the table 14, since screws and other metal objects in the table could be heated by the radiation. By this means a magnetic field is obtained which is substantially directed upwards from the heating mat 10, as illustrated in FIG. 1.

In the present embodiment the heating elements 22 are distributed in such a manner that there are four heating elements 22 in the width of the heating mat 10. This is illustrated in FIG. 3. It will, of course, be possible to vary the number, spacing and relative positions of the heating elements 22 according to the desired area of application.

Figure 4:
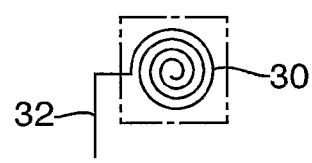
FIG. 4 illustrates an induction element.

In FIG. 4 a heating element of this kind is illustrated, comprising a preferably spiral-shaped electrical conductor 30 with a supply conductor 32. The supply conductor 32 is connected to supply conductors to other heating elements 22 and/or connected directly to the energy converter 11 via the cable 12. The cable 12 can therefore comprise a number of electrical conductors 30. Thus each heating element 22 is an induction coil that generates a time-variable magnetic field by means of the electric current from the energy converter 11. The heating element 12 may further comprise support means (not shown) for maintaining the shape of the electrical conductor 30 during production, since the latter in itself does not have sufficient rigidity. The support means may comprise adhesive or the like, or may be made of the same material as the plate 20.

The heating mat 10 may be produced by casting or smelting in the heating elements 22 and the ferrite layer into the plate 20, or by gluing together several plates 20 with heating elements 22 and the ferrite layer placed in layers between them.

Figure 2:
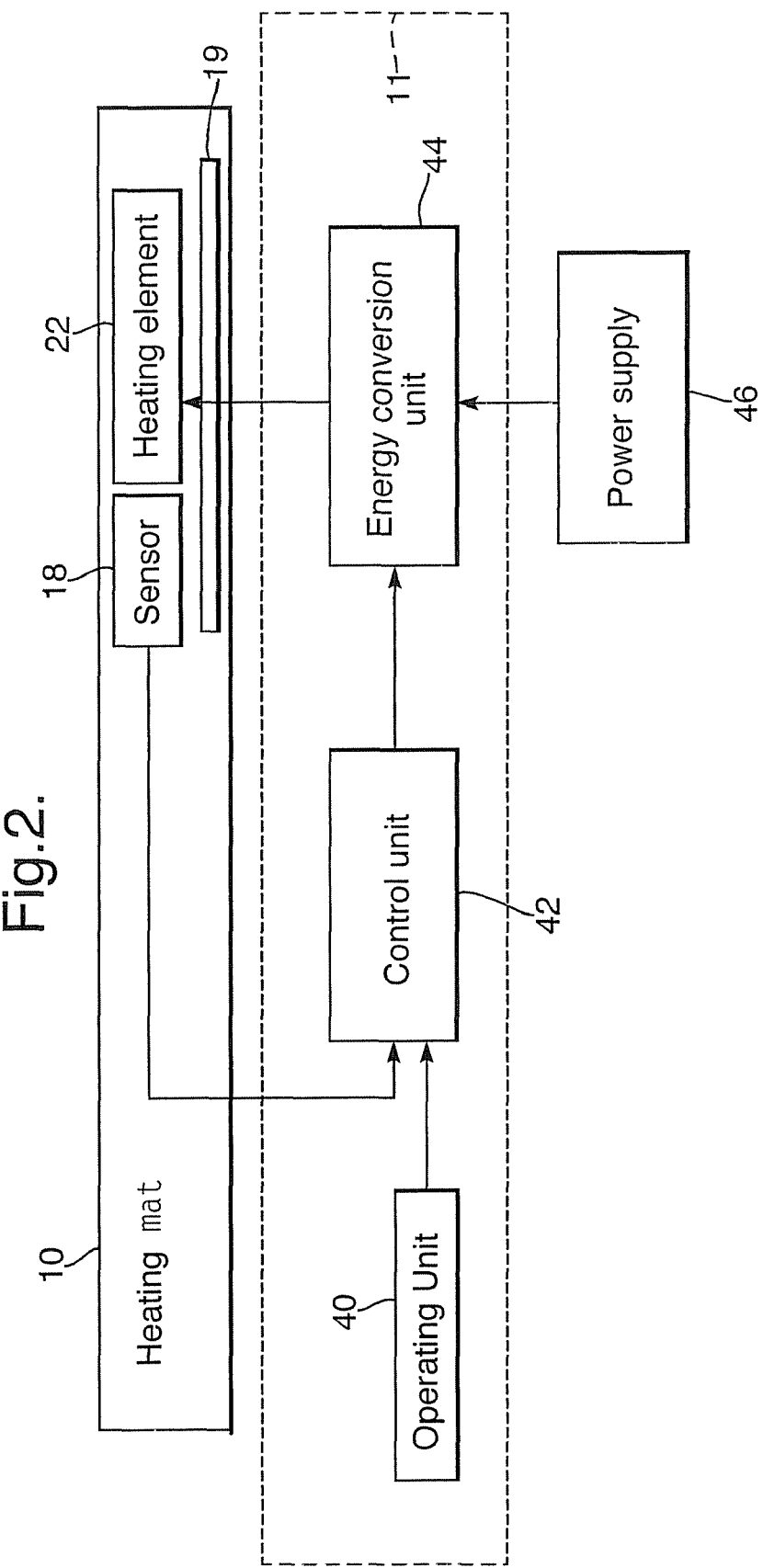
FIG. 2 is a block diagram of the present invention.

The heating mat preferably also comprises a plurality of sensors 18 (FIG. 2). These will be described below.

Figure 5A:
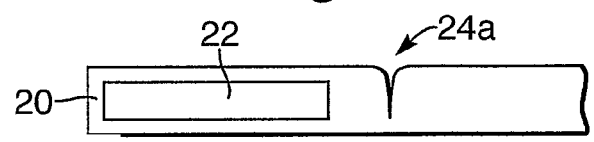
FIGS. 5A and 5B illustrate various weak points in the heating mat.
Figure 5B:
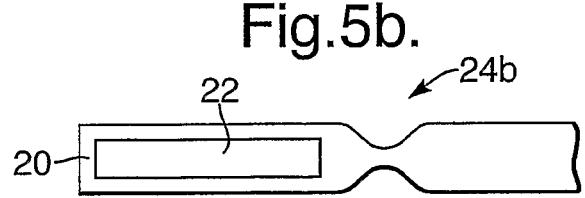

Furthermore weak points 24a, 24b are preferably provided in the plate 20 (illustrated in FIGS. 5A and 5B). The weak points 24a, 24b are located periodically along and/or across the plate 20, and help to simplify folding of the heating mat 10 for storage. The weak points 24a, 24b may be a substantially V-shaped section (FIG. 5A) or substantially U-shaped grooves (FIG. 5B) in the plate 20, but they may also be perforated with through-going cut-outs at intervals.

The energy converter 11 will now be described with reference to FIG. 2. Here the energy converter 11 comprises a control unit 42 which receives signals from an operating unit 40 and the sensors 18 in the heating mat 10. The control unit 42 is further connected to an energy conversion unit 44.

The operating unit 40 comprises one or more switches and one or more temperature indicators that give a reference signal for temperature to the control unit 42. The heating mat 10 can thereby be divided into several temperature zones, where switching on and off and temperature control can be individually set for each zone.

In the preferred embodiment the sensors 18 are temperature sensors that are mounted close to one or more heating elements 22. The sensors 18 record the surface temperature in the heating mat 10, which the control unit 42 then uses to control the power to the heating elements 22. For example, a check can be made as to whether food is placed on an adjacent heating element that needs continuous heating, and this is done by switching on the induction heating for a brief moment. A check is then made as to whether the surface temperature of the cloth/underlay increases. If the temperature increases, this is interpreted as being an induction container with food placed on the heating element. If the temperature does not rise, the induction heating is switched off again.

The control unit 42 comprises a suitable microprocessor and electronic storage devices or possibly programmable logic for receiving and transmitting signals as described above.

The energy conversion unit 44 receives electrical energy from the power supply 46 and supplies converted energy for induction heating to the heating element 22 in the heating mat 10 based on the control signals from the operating unit 40 and the sensors 18. The energy conversion unit 44 comprises an induction resonator that converts the energy from the mains voltage to a voltage with a frequency which, for example, varies in the range 20-40 kHz and which generates a suitable magnetic field capable of maintaining the temperature in food and drink.

The embodiment described above is intended as an example of the present invention, and it will, of course be possible for a person skilled in the art to vary it within the scope of the patent claims. For small heating mats 10 it will probably be possible to equip the energy converter 11 with a handle, and it will need no separate transport unit, but possibly can be attached to the table 14. It will, of course, also be possible to omit the sensors and only have the ability to switch off and on one or more zones on the heating mat 10.

The invention claimed is:

1. A device for maintaining temperature in food and drink by means of the induction principle, comprising a heating mat, on which induction containers and other types of containers for food and drink can be placed, and an energy converter for connection to a power supply and to the heating mat, where the energy converter converts the energy from the power supply to induction energy and where the heating mat further comprises:

a flexible plate of a heat-resistant, non-metallic material, at least one heating element comprising an induction coil for generating a varying magnetic field by means of the induction energy from the energy converter, a temperature sensor mounted close to each heating element for recording the surface temperature in the heating mat near the heating element, an operating unit comprising switches and temperature indicators, thereby dividing the heating mat into several temperature zones, where temperature can be individually set for each zone, a layer of a metallic material arranged under each heating element for limiting the varying electromagnetic field in a downwardly direction, a control unit connected to the operating unit, the temperature sensors and heating elements, where the control unit is further connected to an energy conversion unit for controlling the power supplied to the heating elements from the power supply, where the control unit is provided to detect whether an induction container is placed on an adjacent heating element by switching on the heating element for a brief moment, and thereafter switch on or off the heating element depending on whether the surface temperature of the heating mat increases or not.

2. A device according to patent claim 1, wherein the heating element is cast into, smelted into, glued to or mounted in the plate.

3. A device according to claim 1 or 2, wherein the heat-resistant material in the plate can withstand a continuous temperature of approximately 100° C. and a maximum, transitory temperature of approximately 130° C.

4. A device according to claim 3, wherein the material in the plate is flexible to enable the plate to be rolled up, bent or folded for storage.

5. A device according to claim 4 wherein weak points are provided in the plate in order to simplify folding up, bending or rolling of the heating mat for storage.

* * * * *